US012633820B2

(12) United States Patent
Feng et al.

(10) Patent No.: US 12,633,820 B2
(45) Date of Patent: May 19, 2026

(54) SWITCHING POWER SUPPLY AND METHOD FOR CONTROLLING SWITCHING POWER SUPPLY

(71) Applicant: Southchip Semiconductor Technology (Shanghai) Co., Ltd., Shanghai (CN)

(72) Inventors: Lin Feng, Shanghai (CN); Jianlong Gao, Shanghai (CN); Yuang Huang, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 256 days.

(21) Appl. No.: 18/495,720

(22) Filed: Oct. 26, 2023

(65) Prior Publication Data

US 2024/0413743 A1 Dec. 12, 2024

(30) Foreign Application Priority Data

Jun. 9, 2023 (CN) .......................... 202310684697.8

(51) Int. Cl.
*H02M 1/36* (2007.01)
*H02M 1/08* (2006.01)
*H02M 1/38* (2007.01)
*H02M 3/335* (2006.01)

(52) U.S. Cl.
CPC .............. *H02M 1/36* (2013.01); *H02M 1/38* (2013.01); *H02M 3/33592* (2013.01); *H02M 1/08* (2013.01)

(58) Field of Classification Search
CPC ............................ H02M 3/33592; H02M 1/36
See application file for complete search history.

(56) References Cited

U.S. PATENT DOCUMENTS 5,757,627 A * 5/1998 Faulk ................ H02M 3/33576
363/21.16
10,658,937 B1 * 5/2020 Zafarana ............... H02M 1/083
2009/0213623 A1 * 8/2009 Yang ................. H02M 3/33592
363/125

(Continued)

FOREIGN PATENT DOCUMENTS

CN 107104585 8/2017
CN 113890378 1/2022

(Continued)

*Primary Examiner* — Gustavo A Rosario-Benitez

(57) ABSTRACT

Disclosed are a switching power supply and a control method thereof. The method includes: upon startup of the switching power supply, sending a first handshake signal to a primary control module to control a primary master control power transistor to stop a switching operation; upon elapse of a first duration, in response to a voltage value at a connection point failing to satisfy a predetermined condition within a second duration, determining that the primary master control power transistor stops the switching operation, and sending a second handshake signal to control the primary master control power transistor to perform the switching operation; and in response to the voltage value at the connection point satisfying the predetermined condition within a third duration, determining that the primary master control power transistor performs the switching operation, and adjusting a switching state of the primary master control power transistor.

15 Claims, 5 Drawing Sheets

(56)        References Cited

U.S. PATENT DOCUMENTS

| | | | | |
|---|---|---|---|---|
| 2016/0111961 | A1* | 4/2016 | Balakrishnan .... | H02M 3/33507 |
| | | | | 363/21.12 |
| 2020/0169179 | A1* | 5/2020 | Hara ..................... | H02M 1/38 |
| 2021/0376712 | A1* | 12/2021 | Chen ..................... | H02M 1/08 |
| 2022/0173651 | A1* | 6/2022 | Tang ..................... | H02M 1/36 |

FOREIGN PATENT DOCUMENTS

| | | |
|---|---|---|
| CN | 114498563 | 5/2022 |
| CN | 216437062 | 5/2022 |
| DE | 102019206636 | 11/2020 |

* cited by examiner

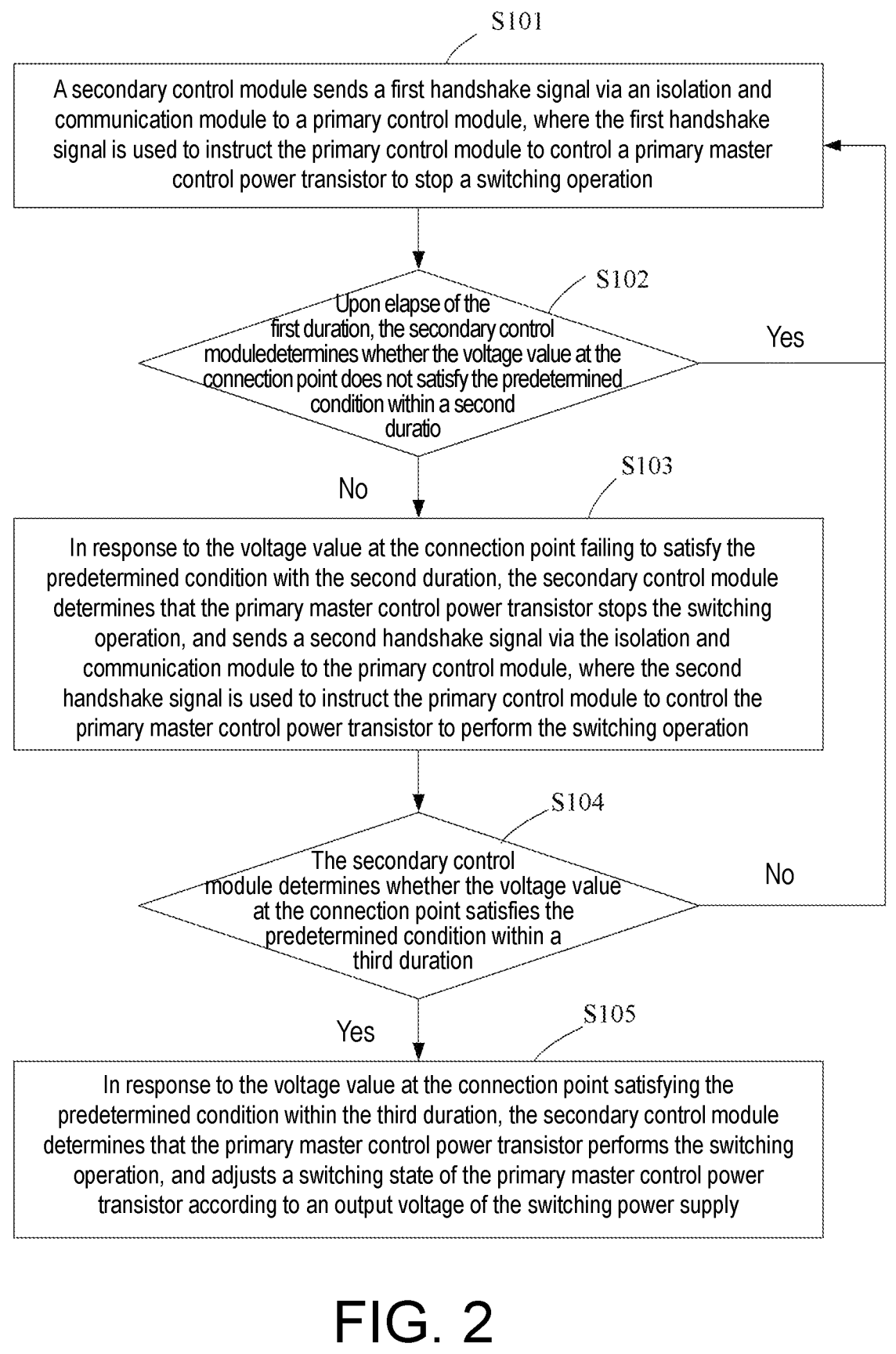

S101

A secondary control module sends a first handshake signal via an isolation and communication module to a primary control module, where the first handshake signal is used to instruct the primary control module to control a primary master control power transistor to stop a switching operation

S102

Upon elapse of the first duration, the secondary control module determines whether the voltage value at the connection point does not satisfy the predetermined condition within a second duratio Yes No

S103

In response to the voltage value at the connection point failing to satisfy the predetermined condition with the second duration, the secondary control module determines that the primary master control power transistor stops the switching operation, and sends a second handshake signal via the isolation and communication module to the primary control module, where the second handshake signal is used to instruct the primary control module to control the primary master control power transistor to perform the switching operation

S104

The secondary control module determines whether the voltage value at the connection point satisfies the predetermined condition within a third duration No Yes

S105

In response to the voltage value at the connection point satisfying the predetermined condition within the third duration, the secondary control module determines that the primary master control power transistor performs the switching operation, and adjusts a switching state of the primary master control power transistor according to an output voltage of the switching power supply

FIG. 2

SWITCHING POWER SUPPLY AND METHOD FOR CONTROLLING SWITCHING POWER SUPPLY

CROSS-REFERENCE TO RELATED APPLICATION

This application is based upon and claims the priority of Chinese Patent Application No. 202310684697.8, filed on Jun. 9, 2023, the entire content of which is hereby incorporated by reference herein and made a part of this specification.

BACKGROUND

Technical Field

The present disclosure relates to the technical field of switching power supplies, and in particular, relates to a switching power supply and a control method thereof.

Description of Related Art

In an isolated switching power supply, a control portion includes a primary controller configured to control a primary master control power transistor, a secondary controller configured to control a secondary synchronous rectifier transistor, and an isolator configured to implement communication between the secondary controller and the primary controller.

At present, in a secondary control architecture, the primary master control power transistor is controlled by the secondary controller. Upon startup or restart of the switching power supply, where a supplied voltage of the secondary controller fails to reach an operating voltage for normal operation of the secondary controller, or the secondary controller is in a dormant state, the secondary controller may not transmit any signal to the primary controller. In this case, the primary master controller power transistor is controlled by the primary controller, and in the case that the secondary controller transmits a control signal to the primary controller, the primary master control power transistor is controlled by the secondary controller, such that the primary master control power transistor and the secondary synchronous rectifier transistor are prevented from being simultaneously turned on.

Therefore, in the above process, it is an urgent issue to implement communication between the primary controller and the secondary controller such that control over the primary master control power transistor is smoothly shifted from the primary controller to the secondary controller.

SUMMARY

Various embodiments of the present disclosure provide a switching power supply and a control method thereof.

In one aspect of the embodiments of the present disclosure, a switching power supply is provided. The switching power supply includes: a transformer, a primary control module, a secondary control module, a primary master control power transistor, a secondary synchronous rectifier transistor, and an isolation and communication module.

A primary side of the transformer is electrically connected to the primary master control power transistor, the primary master control power transistor is further electrically connected to the primary control module, a secondary side of the transformer is electrically connected to the secondary synchronous rectifier transistor, a connection point between the secondary side of the transformer and the secondary synchronous rectifier transistor is electrically connected to the secondary control module, the primary control module is further electrically connected to the isolation and communication module, and the isolation and communication module is further electrically connected to the secondary control module.

The secondary control module is configured to, upon startup of the switching power supply, send a first handshake signal via the isolation and communication module to the primary control module, where the first handshake signal is used to instruct the primary control module to control the primary master control power transistor to stop a switching operation.

The secondary control module is further configured to, upon elapse of a first duration, in response to a voltage value at the connection point failing to satisfy a predetermined condition within a second duration, determine that the primary master control power transistor stops the switching operation, and send a second handshake signal to the primary control module via the isolation and communication module, where the second handshake signal is used to instruct the primary control module to control the primary master control power transistor to perform the switching operation.

The secondary control module is further configured to, in response to the voltage value at the connection point satisfying the predetermined condition within a third duration, determine that the primary master control power transistor performs the switching operation, and adjust a switching state of the primary master control power transistor according to an output voltage of the switching power supply.

In some embodiments, the secondary control module is further configured to send the first handshake signal to the primary control module via the isolation and communication module in response to the voltage value at the connection point satisfying the predetermined condition within the second duration or failing to satisfy the predetermined condition within the third duration.

In some embodiments, the secondary control module includes: a synchronous rectification control unit, a close-loop control unit, a secondary handshake unit, a synchronous rectification detection unit, a handshake timing unit, and a first logic OR gate.

The connection point is located between the secondary side of the transformer and a first terminal of the secondary synchronous rectifier transistor, a first terminal of the synchronous rectification detection unit is electrically connected to the connection point, a second terminal of the synchronous rectification detection unit is electrically connected to a first terminal of the synchronous rectification control unit, a third terminal of the synchronous rectification detection unit is electrically connected to a first terminal of the secondary handshake unit, a second terminal of the secondary handshake unit is electrically connected to both a second terminal of the synchronous rectification control unit and a first terminal of the close-loop control unit, a third terminal of the synchronous rectification control unit is electrically connected to a second terminal of the secondary synchronous rectifier transistor, a third terminal of the secondary synchronous rectifier transistor and the secondary control module are both electrically connected to a secondary signal ground of the transformer, a third terminal of the secondary handshake unit is electrically connected to a first terminal of the handshake timing unit, a second terminal of the handshake timing unit is electrically connected to a first terminal of the first logic OR gate, a second terminal of the close-loop control unit is connected to the output voltage of the switching power supply, a third terminal of the close-loop control unit is electrically connected to a second terminal of the first logic OR gate, a fourth terminal of the secondary handshake unit is electrically connected to the isolation and communication module, and a third terminal of the first logic OR gate is electrically connected between the fourth terminal of the secondary handshake unit and the isolation and communication module.

The secondary handshake unit is configured to, upon startup of the switching power supply, send a first signal to the handshake timing unit.

The handshake timing unit is configured to send a second signal to the first logic OR gate according to the first signal, where the second signal is used to control a frequency and pulse width of the first handshake signal.

The first logic OR gate is configured to send the first handshake signal to the primary control module via the isolation and communication module according to the second signal.

The synchronous rectification detection unit is configured to, upon elapse of the first duration, in response to the voltage value at the connection point failing to satisfy the predetermined condition within the second duration, determine that the primary master control power transistor stops the switching operation, and send a third signal to the secondary handshake unit.

The secondary handshake unit is further configured to, in response to a level of the third signal failing to be raised, determine that a first handshake between the primary control module and the secondary control module is successful, and send a fourth signal to the handshake timing unit.

The handshake timing unit is further configured to send a fifth signal to the first logic OR gate according to the fourth signal, where the fifth signal is used to control a frequency and pulse width of the second handshake signal.

The first logic OR gate is further configured to send the second handshake signal to the primary control module via the isolation and communication module based on the fifth signal.

The synchronous rectification detection unit is further configured to, in response to the voltage value at the connection point satisfying the predetermined condition within the third duration, determine that the primary master control power transistor performs the switching operation, and send a sixth signal to the secondary handshake unit and send a drive signal to the synchronous rectification control unit.

The secondary handshake unit is further configured to, in response to a level of the sixth signal being raised, determine that a second handshake between the primary control module and the secondary control module is successful, and send an indication signal with a predetermined level to the close-loop control unit and the synchronous rectification control unit.

The close-loop control unit is configured to, in response to a change of the level of the indication signal, send a seventh signal to the first logic OR gate according to the output voltage of the switching power supply, where the seventh signal is used to control a frequency and pulse width of a control signal, and the frequency and pulse width of the control signal are used to adjust a switching state of the primary master control power transistor.

The first logic OR gate is further configured to send the control signal to the primary control module via the isolation and communication module according to the seventh signal.

The synchronous rectification control unit is configured to output an eighth signal to the secondary synchronous rectifier transistor according to the drive signal and the indication signal, where the eighth signal is used to control turn-on and turn-off of the secondary synchronous rectifier transistor.

In some embodiments, the primary control module includes: a primary handshake unit, a startup unit, a demodulation unit, a comparator, a second logic OR gate, a third logic OR gate, a turn-on module, and an RS flip-flop.

A first terminal of the primary handshake unit, a first terminal of the demodulation unit, and a second input terminal of the second logic OR gate are all electrically connected to the isolation and communication module, a second terminal of the primary handshake unit is electrically connected to a first terminal of the startup unit, a second terminal of the startup unit is electrically connected to a first input terminal of the second logic OR gate, an output terminal of the second logic OR gate is electrically connected to an S input terminal of the RS flip-flop, a Q output terminal of the RS flip-flop is electrically connected to a first terminal of the primary master control power transistor, a second terminal of the primary master control power transistor is electrically connected to the primary side of the transformer, a third terminal of the primary master control power transistor is electrically connected to the primary signal ground of the transformer, a connection point between the third terminal of the primary master control power transistor and the primary signal ground of the transformer is electrically connected to a first input terminal of the comparator, a second input terminal of the comparator is electrically connected to a second terminal of the demodulation unit, a first input terminal of the third logic OR gate is electrically connected to the turn-on module, the turn-on module is configured to output a maximum turn-on duration, an output terminal of the comparator is electrically connected to a second input terminal of the third logic OR gate, and an output terminal of the third logic OR gate is electrically connected to an R input terminal of the RS flip-flop.

The startup unit is configured to, upon startup of the switching power supply, control the primary master control power transistor to be turned on according to a clock signal.

The demodulation unit is configured to control, according to a first current value and an actual current value of the primary master control power transistor, the primary master control power transistor to be turned off.

The primary handshake unit is configured to send a first stop signal to the startup unit in response to receiving the first handshake signal via the isolation and communication module.

The startup unit is further configured to, in response to the first stop signal, stop controlling, according to the clock signal, the primary master control power transistor to be turned on.

The demodulation unit is configured to, in response to receiving the first handshake signal via the isolation and communication module, demodulate a second current value modulated in the first handshake signal, and control the primary master control power transistor to be turned off according to the second current value and the actual current value of the primary master control power transistor.

The primary handshake unit is configured to send a second stop signal to the startup unit in response to receiving the second handshake signal via the isolation and communication module;

The startup unit is further configured to, in response to the second stop signal, stop controlling, according to the clock signal, the primary master control power transistor to be turned on.

The demodulation unit is configured to, in response to receiving the second handshake signal via the isolation and communication module, demodulate a third current value modulated in the second handshake signal, and control the primary master control power transistor to be turned on according to the third current value and the actual current value of the primary master control power transistor.

In another aspect of the embodiments of the present disclosure, a control method is provided. The method is applicable to the switching power supply according to the first aspect and various possible implementations thereof.

The method includes: upon startup of the switching power supply, sending, by the secondary control module, a first handshake signal via the isolation and communication module to the primary control module, where the first handshake signal is used to instruct the primary control module to control the primary master control power transistor to stop a switching operation; upon elapse of a first duration, in response to a voltage value at the connection point failing to satisfy a predetermined condition within a second duration, determining, by the secondary control module, that the primary master control power transistor stops the switching operation, and sending a second handshake signal via the isolation and communication module to the primary control module, where the second handshake signal is used to instruct the primary control module to control the primary master control power transistor to perform the switching operation; and in response to the voltage value at the connection point failing to satisfy the predetermined condition within a third duration, determining, by the secondary control module, that the primary master control power transistor performs the switching operation, and adjusting a switching state of the primary master control power transistor according to an output voltage of the switching power supply.

In some embodiments, the method further includes: sending, by the secondary control module, the first handshake signal via the isolation and communication module to the primary control module in response to the voltage value at the connection point satisfying the predetermined condition within the second duration or failing to satisfy the predetermined condition within the third duration.

In some embodiments, the switching power supply is a charger, for example, a charger of an electronic device.

In some embodiments, the predetermined condition includes: the voltage value at the connection point changing from being greater than a predetermined threshold to being less than the predetermined threshold.

In some embodiments, the predetermined condition includes: a duration where the voltage value is less than the predetermined threshold being greater than or equal to a predetermined duration.

In some embodiments, a period of the first handshake signal is greater than or equal to a sum of the first duration and the second duration.

In some embodiments, a period of the second handshake signal is greater than or equal to the third duration.

In the switching power supply and the control method thereof, upon startup of the switching power supply, the secondary control module sends the first handshake signal via the isolation and communication module to the primary control module, such that the primary control module is instructed, by the first handshake signal, to control the primary master control power transistor to stop the switching operation. Upon elapse of the first duration, in response to the voltage value at the connection point failing to satisfy the predetermined condition within the second duration, the secondary control module determines that the primary master control power transistor stops the switching operation, such that the first handshake between the secondary control module and the primary control module is successfully implemented. The secondary control module sends the second handshake signal via the isolation and communication module to the primary control module, such that the primary control module is instructed, by the second handshake signal, to control the primary master control power transistor to perform the switching operation. In response to the voltage value at the connection point satisfying the predetermined condition within the third duration, the secondary control module determines that the primary master control power transistor performs the switching operation, such that the second handshake between the secondary control module and the primary control module is successfully implemented. In this way, the secondary control module gains control over the primary master control power transistor. Therefore, the secondary control module adjusts the switching state of the primary master control power transistor according to the output voltage of the switching power supply.

In summary, on the premise of not arranging additional elements or devices, the secondary control module and the primary control module implement two handshakes therebetween, such that the secondary control module gains control over the primary master control power transistor from the primary control module. This prevents the primary master control power transistor and the secondary synchronous rectifier transistor from being simultaneously turned on, enables communication between the primary side and the secondary side of the switching power supply having the above described secondary control architecture, and ensures that the switching power supply safely and stably operates.

BRIEF DESCRIPTION OF THE DRAWINGS

FIG. 2 is a schematic flowchart of a control method according to an embodiment of the present disclosure;

DESCRIPTION OF THE EMBODIMENTS

Figure 1:
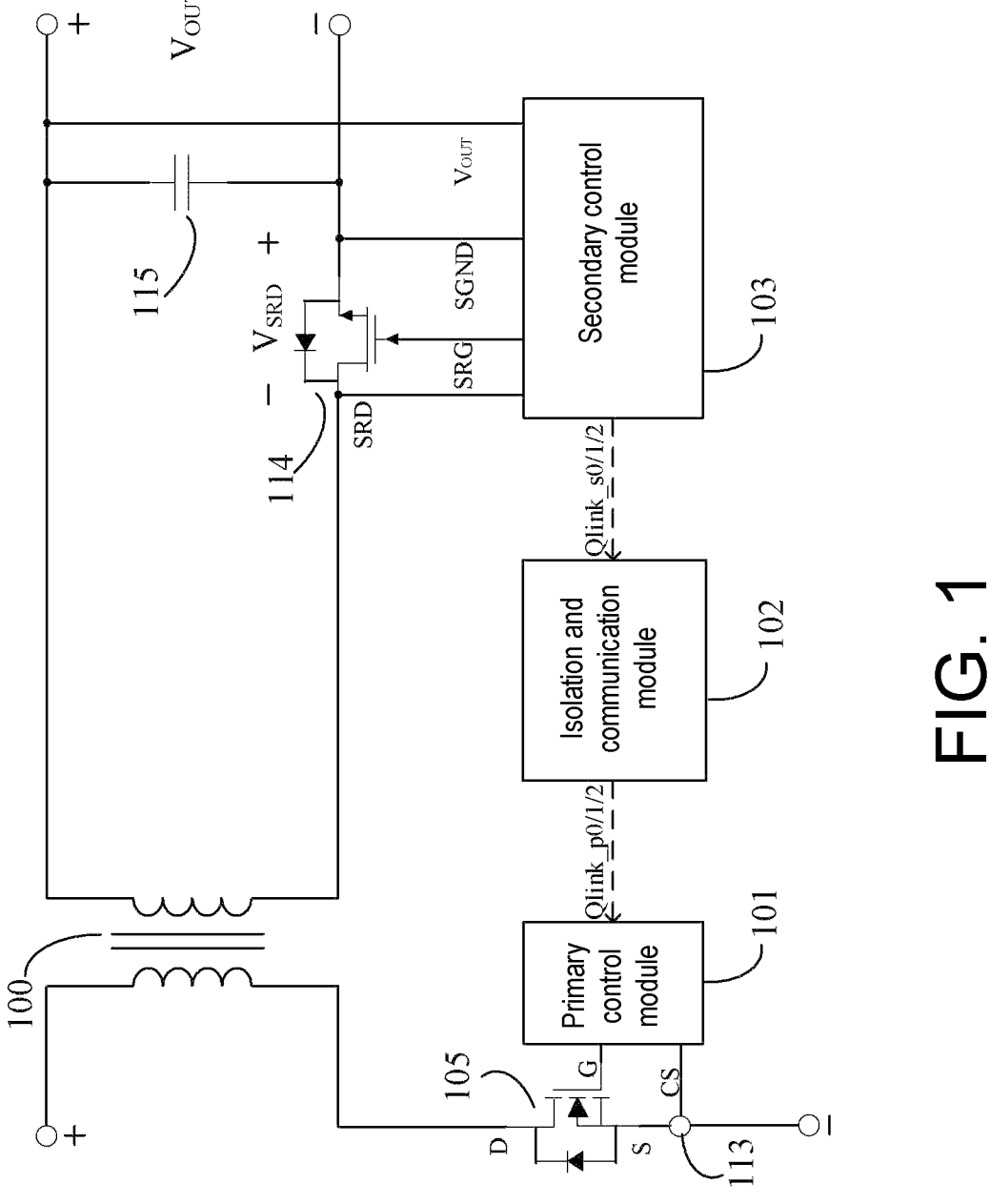
FIG. 1 is a schematic structural diagram of a switching power supply according to an embodiment of the present disclosure.

In the present disclosure, the term "at least one" refers to one or more than one, and the term "a plurality of" refers to two or more than two. The term "and/or" is merely an association relationship for describing associated objects, which represents that there may exist three types of relationships, for example, A and/or B may represent three situations: only A exists, both A and B exist, and only B exists, where A and B may be single or plural. In addition, the symbol "/" generally represents an "or" relationship between associated objects before and after the symbol. The expression "at least one of the following" or the like expression means any combination of the items or options listed, including a single item or option or any combination of plural items or options listed. For example, at least one of a single a, a single b, and a single c may indicate: the single a, the single b, the single c, a combination of a and b, a combination of a and c, a combination of b and c, or a combination of a, b, and c, where each of a, b, and c may be single or plural. In addition, the terms "first," "second," and the like are merely for the illustration purpose, and shall not be construed as indicating or implying a relative importance.

In the description of the present disclosure, it should be understood that the terms "central," "transversal," "longitudinal," "upper," "lower," "left," "right," "front," "rear," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

In the description of the present disclosure, unless otherwise explicitly specified and defined, the terms "connected," "coupled," and derivatives forms thereof shall be understood in a broad sense. For example, the terms "connected," "coupled," and derivatives form thereof for depicting the circuit structure, in addition to physical connection, may also be understood as electrical connections or signal connection. The connection, for example, may be direct connection, i.e., the physical connection or, indirect connection via at least one intermediate element as long as the circuit is conducted, or communication between the interiors of two elements. The signal connection, in addition to signal connection via a circuitry, may also be signal connection via a communication medium, for example, radio waves. Persons of ordinary skill in the art may understand specific meanings of the above terms in the present disclosure according to the actual circumstances and contexts.

The present disclosure provides a switching power supply and a control method thereof. On the premise of not arranging additional circuits, a secondary control module and a primary control module implement many handshakes therebetween, such that the secondary control module gains control over a primary master control power transistor from the primary control module. This enables communication between the primary side and the secondary side of the switching power supply, and ensures that the switching power supply safely and stably operates. In addition, no systematic risk is caused, and integration of the chip system is eased.

The control method is performed by a switching power supply in which a primary master control power transistor is controlled by a secondary control module. The switching power supply is an isolated switching power supply, and has advantages of reducing a cost of optical coupling as an isolation medium, improving a progress of synchronous rectification, and enhancing a speed of dynamic responding. The switching power supply may be applicable to flyback, resonant (LLC for short), asymmetrical half-bridge (AHB), and the like isolation-type switching power supply topologies. In some examples, the switching power supply is a charger, for example, a charger of an electronic device. The electronic device may be a mobile phone, a tablet computer, a laptop computer, a wearable device, a vehicle-mounted device, an augmented reality (AR)/virtual reality (VR) device, an ultra-mobile personal computer (UMPC), a netbook, a personal digital assistant (PDA), a smart TV, a smart screen, a high-definition TV, a 4K TV, a smart speaker, a smart projector, or the like. The present disclosure sets no limitation to the specific type of the electronic device.

For simplicity of description, a scenario where the switching power supply is a feedback switching power supply topology is used as an example for illustration of the present disclosure.

FIG. 1 is a schematic structural diagram of a switching power supply according to an embodiment of the present disclosure. As illustrated in FIG. 1, the switching power supply may include: a transformer 100, a primary control module 101, a secondary control module 103, a primary master control power transistor 105, a secondary synchronous rectifier transistor 114, and an isolation and communication module 102.

A primary side of the transformer 100 is electrically connected to the primary master control power transistor 105, the primary master control power transistor 105 is further electrically connected to the primary control module 101, a secondary side of the transformer 100 is electrically connected to the secondary synchronous rectifier transistor 114, a connection point (SRD) between the secondary side of the transformer 100 and the secondary synchronous rectifier transistor 114 is electrically connected to the secondary control module 103, the primary control module 101 is further electrically connected to the isolation and communication module 102, and the isolation and communication module 102 is further electrically connected to the secondary control module 103.

The transformer 100 divides the switching power supply into a primary side and a secondary side. The primary side and the secondary side are completely isolated from each other. The transformer 100 is configured to implement isolation and power transmission between the primary side and the secondary side.

The primary control module 101 is configured to receive a signal from the secondary control module 103 via the isolation and communication module 102, and control the primary master control power transistor 105 to be turned on or turned off.

Since the primary master control power transistor 105 and the secondary synchronous rectifier transistor 114 are conducted, a current of the transformer 100 abruptly increases, and the switching power supply is in an approximate short circuit state. In this case, the power transistor and the related devices may be damaged, and the switching power supply may be subject to a safety accident. Therefore, the secondary control module 103 controls the switching power supply, and thus the primary master control power transistor 105 and the secondary synchronous rectifier transistor 114 are prevented from being simultaneously turned on (that is, simultaneous operation). The secondary control module 103 is configured to control turn-on and turn-off of the secondary synchronous rectifier transistor 114, send a signal to the primary control module 101 via the isolation and communication module 102, and control turn-on and turn-off of the primary master control power transistor 105 according to the signal.

The primary master control power transistor 105 or the secondary synchronous rectifier transistor 114 may employ a field-effect transistor, for example, a metal-oxide semiconductor field-effect transistor (MOSFET). The MOSFET includes an N-type MOSFET (NMOSFET or NMOS), and a P-type MOSFET (PMOSFET or PMOS).

For brevity of the description, the present disclosure is described using a scenario where the primary master control power transistor 105 is an enhanced NMOS transistor, and the secondary synchronous rectifier transistor 114 is an enhanced NMOS transistor as an example.

The isolation and communication module 102 may implement signal transmission between the primary control module 101 and the secondary control module 103. The isolation and communication module 102 is configured to convert the signal from the secondary control module 103 into a signal receivable by the primary control module 101 by modulation and/or demodulation, and transmit the converted signal to the primary control module 101. The isolation and communication module 102 may be practiced by capacitive isolation or magnetic isolation, which is not limited in the present disclosure.

In addition, still referring to FIG. 1, the switching power supply may further include: an output capacitor 115. The output capacitor 115 is electrically connected in parallel between two terminals of the secondary side of the transformer 100. The output capacitor 115 is configured to stabilize an output signal from the switching power supply.

Based on the above description, using a startup stage, a first handshake stage, and a second handshake stage as examples, in combination with FIG. 2, upon startup of the switching power supply, a specific control process of a secondary control architecture of the switching power supply is described.

FIG. 2 is a schematic flowchart of a control method according to an embodiment of the present disclosure.

In S101, a secondary control module sends a first handshake signal via an isolation and communication module to a primary control module, where the first handshake signal is used to instruct the primary control module to control a primary master control power transistor to stop a switching operation.

In S102, upon elapse of the first duration, the secondary control module determines whether the voltage value at the connection point does not satisfy the predetermined condition within a second duration.

In the case that the voltage value at the connection point does not satisfy the predetermined condition within the second duration, S103 is performed. In the case that the voltage value at the connection point satisfies within the second duration the predetermined condition, S101 is performed.

In S103, in response to the voltage value at the connection point failing to satisfy the predetermined condition within the second duration, the secondary control module determines that the primary master control power transistor stops the switching operation, and sends a second handshake signal via the isolation and communication module to the primary control module, where the second handshake signal is used to instruct the primary control module to control the primary master control power transistor to perform the switching operation.

In S104, the secondary control module determines whether the voltage value at the connection point satisfies the predetermined condition within a third duration.

In the case that the voltage value at the connection point satisfies the predetermined condition within the third duration, S105 is performed. In the case that the voltage value at the connection point does not satisfy the predetermined condition within the third duration, S101 is performed.

In S105, in response to the voltage value at the connection point satisfying the predetermined condition within the third duration, the secondary control module determines that the primary master control power transistor performs the switching operation, and adjusts a switching state of the primary master control power transistor according to an output voltage of the switching power supply.

1. Startup Stage

Upon startup of the switching power supply, the primary control module 101 is powered. Considering that the secondary control module 103 may not be powered, that is, the secondary control module 103 fails to normally operate, the secondary control module 103 may not send any control signal to the primary control module 101. In this case, the switching power supply fails to normally operate, fails to startup, and is consequently in a dead halt state.

Based on the above description, when powered, the primary control module 101 may control the primary master control power transistor 105 to perform a switching operation, and the primary control module 101 may be in a wait handshake state.

The startup of the switching power supply according to the present disclosure may include starting up the switching power supply or restarting the primary side. Starting up the switching power supply refers to powering on the switching power supply.

The primary master control power transistor 105 performing the switching operation according to the present disclosure means that the primary master control power transistor 105 is alternately switched between turn-on and turn-off. During the switching, the primary master control power transistor 105 may be first turned on and then turned off, or may be first turned off and then turned on, which is not limited in the present disclosure.

The secondary control module 103 may be powered in a variety of ways. For example, the output voltage (Vout) of the switching power supply or the voltage at the connection point (SRD) may power the secondary control module 103.

2. First Handshake Stage

When powered, the secondary control module 103 may send a first handshake signal (Qlink_s1) to the isolation and communication module 102. The isolation and communication module 102 may modulate and/or demodulate the first handshake signal, and acquire a processed first handshake signal (Qlink_p1), such that the primary control module 101 receives the processed first handshake signal. The isolation and communication module 102 may send the processed first handshake signal to the primary control module 101.

The first handshake signal or the processed first handshake signal is used to instruct the primary control module 101 to control the primary master control power transistor 105 to stop a switching operation. The primary master control power transistor 105 stopping the switching operation according to the present disclosure means stopping alternate switching of the primary master control power transistor 105 between turn-on and turn-off. That is, the primary master control power transistor 105 has no switching operation or does not perform the switching operation. For example, the primary master control power transistor 105 failing to be turned on means that the primary master control power transistor 105 stops the switching operation.

Upon receiving the processed first handshake signal, the primary control module 101 may exit a handshake wait state. The primary control module 101 may control the primary master control power transistor 105 to stop the switching operation according to the processed first handshake signal.

It should be noted that upon receiving the processed first handshake signal, the primary control module 101 may be still in the handshake wait state. The primary control module 101 may ignore the processed first handshake signal, and may not control the primary master control power transistor 105 to stop the switching operation.

Upon elapse of the first duration (T_BLK), the secondary control module 103 may detect whether the voltage value (VSRD) at the connection point (SRD) does not satisfy the predetermined condition within the second duration (T1_Window).

The first duration is used to ensure that the primary control module 101 has sufficient time to control the primary master control power transistor 105 to stop the switching operation. Counting of the first duration may start from the time the secondary control module 103 sends the first handshake signal. The second duration is a detection time window, and the second duration is used to ensure that the secondary control module 103 has sufficient time to detect whether the primary master control power transistor 105 stops the switching operation. Counting of the second duration may start upon elapse of the first duration. The specific values of the first duration and the second duration are not limited in the present disclosure.

The first handshake signal has a predetermined period, and the specific value of the period of the first handshake signal is not limited in the present disclosure. In some examples, the period of the first handshake signal is greater than or equal to a sum of the first duration and the second duration, such that the secondary control module 103 has sufficient time to detect the entire process of controlling the primary master control power transistor 105 to stop the switching operation.

The predetermined condition is related to the primary master control power transistor 105 performing the switching operation, or the predetermined condition is related to the primary master control power transistor 105 stopping the switching operation. The predetermined condition may be defined according to variations of the voltage value at the connection point, to determine whether the primary master control power transistor 105 to perform the switching operation or stopping the switching operation.

Using the secondary synchronous rectifier transistor 114 being an NMOS transistor as an example, a positive electrode of a body diode in the secondary synchronous rectifier transistor 114 is electrically connected to the connection point, and the voltage value at the connection point may be as follows.

When the primary master control power transistor 105 performs the switching operation, after the primary master control power transistor 105 is turned off, the transformer 100 starts freewheeling to the secondary side, and the positive electrode of the body diode in the secondary synchronous rectifier transistor 114 is at a low level, that is, the voltage value at the connection point is about 0 V, and the secondary side outputs charges, that is, the switching power supply outputs energy to the output voltage (Vout) of the switching power supply.

Upon a period of time the primary master control power transistor 105 stops the switching operation, the transformer 100 has no current, and the positive electrode of the body diode in the secondary synchronous rectifier transistor 114 is at a high level, that is, the voltage value at the connection point is greater than 0 V, and the output voltage (Vout) of the switching power supply is maintained by an output capacitor 115.

Based on the above content, in some examples, the predetermined condition includes: the voltage value at the connection point changing from being greater than a predetermined threshold (Vth) to being less than the predetermined threshold (Vth), for example, the predetermined threshold is approximately equal to 0 V. That is, the predetermined threshold may be equal to 0 V, or may be slightly less than 0 V, or may be slightly greater than 0 V. For brevity of description, in the present disclosure, description is given using the predetermined threshold (Vth) being equal to 0 V as an example.

In this way, after the primary master control power transistor 105 performs the switching operation, the voltage value at the connection point satisfies the predetermined condition. After the primary master control power transistor 105 stops the switching operation (or has no switching operation), the voltage value at the connection point does not satisfy the predetermined condition.

The predetermined condition may further include: a duration where the voltage value is less than the predetermined threshold being greater than or equal to a predetermined duration. The specific value of the predetermined duration is not limited in the present disclosure. Therefore, considering that the voltage value at the connection point at resonance may be less than the predetermined threshold, by configuring the predetermined duration, mis-operations of a zero-crossing voltage at resonance are filtered, such that the accuracy of determining that the primary master control power transistor 105 stops the switching operation (or has no switching operation) is improved.

Further, the predetermined condition may include: the voltage value at the connection point changing from being less than the predetermined threshold to being greater than the predetermined threshold, for example, the predetermined threshold is approximately equal to 0 V. In addition, the predetermined condition may further include: a duration where the voltage value is greater than the predetermined threshold being greater than or equal to the predetermined duration. In this way, after the primary master control power transistor 105 performs the switching operation, the voltage value at the connection point does not satisfy the predetermined condition. After the primary master control power transistor 105 stops the switching operation, the voltage value at the connection point satisfies the predetermined condition.

21. Failure of First Handshake

In response to the voltage value at the connection point satisfying the predetermined condition within the second duration, the secondary control module 103 determines that the primary master control power transistor 105 still performs the switching operation. Apparently, the secondary control module 103 fails to control, according to the first handshake signal, the primary master control power transistor 105 to stop alternate switching between turn-on and turn-off, that is, the first handshake between the secondary control module 103 and the primary control module 101 fails.

In this case, the secondary control module 103 may initiate a next handshake with the primary control module 101. The secondary control module 103 continues sending the first handshake signal to the primary control module 101 via the isolation and communication module 102, such that the secondary control module 103 controls, according to the first handshake signal, the primary master control power transistor 105 to stop the switching operation. For the specific implementation, reference may be made to the above description, which is not described herein any further.

22. Success of First Handshake

In response to the voltage value at the connection point failing to satisfy the predetermined condition within the second duration, the secondary control module 103 determines that the primary master control power transistor 105 stops the switching operation. Apparently, the secondary control module 103 controls, according to the first handshake signal, the primary master control power transistor 105 to stop alternate switching between turn-on and turn-off, that is, the first handshake between the secondary control module 103 and the primary control module 101 is successful.

3. Second Handshake Stage

Upon successful first handshake, the secondary control module 103 sends a second handshake signal (Qlink_s2) to the isolation and communication module 102. The isolation and communication module 102 modulates and/or demodulates the second handshake signal, and acquires a processed second handshake signal (Qlink_p2), such that the primary control module 101 receives the processed second handshake signal. The isolation and communication module 102 sends the processed second handshake signal to the primary control module 101.

The second handshake signal or the processed second handshake signal is used to instruct the primary control module 101 to control the primary master control power transistor 105 to perform the switching operation. In addition, modulation and/or demodulation of the first handshake signal may be the same as or may be different from modulation and/or demodulation of the second handshake signal, which is not limited in the present disclosure.

Upon receiving the processed second handshake signal, the primary control module 101 controls the primary master control power transistor 105 to perform the switching operation according to the processed second handshake signal.

It should be noted that upon receiving the processed second handshake signal, the primary control module 101 may ignore the processed second handshake signal, and may not control the primary master control power transistor 105 to perform the switching operation.

The secondary control module 103 detects whether the voltage value at the connection point satisfies the predetermined condition within a third duration (T2_Window).

The third duration is a detection time window, and the third duration is used to ensure that the secondary control module 103 has sufficient time to detect whether the primary master control power transistor 105 performs the switching operation. Counting of the third duration may start from the time the secondary control module 103 sends the second handshake signal. The specific value of the third duration is not limited in the present disclosure.

The second handshake signal has a predetermined period, and the specific value of the period of the second handshake signal is not limited in the present disclosure. In some examples, the period of the second handshake signal is greater than or equal to the third duration, such that the secondary control module 103 has sufficient time to detect the entire process of controlling the primary master control power transistor 105 to perform the switching operation. In addition, the sum of the first duration and the second duration may greater than the third duration.

31. Failure of Second Handshake

In response to the voltage value at the connection point failing to satisfy the predetermined condition within the third duration, the secondary control module 103 may determine that the primary master control power transistor 105 still stops the switching operation. Apparently, the secondary control module 103 fails to control, according to the second handshake signal, the primary master control power transistor 105 to alternately switch between turn-on and turn-off, that is, the second handshake between the secondary control module 103 and the primary control module 101 fails.

In this case, the secondary control module 103 may initiate a next handshake with the primary control module 101. The secondary control module 103 continues sending the first handshake signal to the primary control module 101 via the isolation and communication module 102, such that the secondary control module 103 controls, according to the first handshake signal, the primary master control power transistor 105 to stop the switching operation. For the specific implementation, reference may be made to the above description, which is not described herein any further.

32. Success of Second Handshake

In response to the voltage value at the connection point satisfying the predetermined condition within the third duration, the secondary control module 103 determines that the primary master control power transistor 105 still performs the switching operation. Apparently, the secondary control module 103 controls, according to the second handshake signal, the primary master control power transistor 105 to alternate switch between turn-on and turn-off, that is, the second handshake between the secondary control module 103 and the primary control module 101 is successful. In this case, the secondary control module 103 gains control over the primary master control power transistor 105.

Therefore, the secondary control module 103 adjusts the switching state of the primary master control power transistor 105 according to the output voltage (Vout) of the switching power supply.

In some examples, the secondary control module 103 may determine loads according to the output voltage of the switching power supply. The secondary control module 103 sends control signals (Qlink_s0) with different frequencies and pulse widths according to different loads respectively. In this way, the secondary control module 103 may send a control signal matching the loads to the isolation and communication module 102. The isolation and communication module 102 may process the control signal so as to acquire a processed control signal (Qlink_p0), and transmit the processed control signal to the primary control module 101 to control the switching state of the primary master control power transistor 105, such that the output energy of the switching power supply is equal to energy desired for output of the switching power supply. In this way, energy close-loop negative feedback control is implemented for the switching power supply, and stable close-loop output of the switching power supply is ensured.

According to the control signal, the secondary control module 103 may control the switching state of the primary master control power transistor 105 in a plurality of ways. The switching state of the primary master control power transistor 105 may include a frequency and/or a current of the primary master control power transistor 105.

For example, the secondary control module 103 employs pulse frequency modulation (PFM), and the specific control is as follows.

In the case that the output voltage of the switching power supply indicates a large load, the switching power supply needs to transmit more energy. In this case, the frequency of the control signal is higher, and the pulse width of the control signal is larger. Correspondingly, the frequency of the primary master control power transistor 105 is higher, and the current of the primary master control power transistor 105 is larger, such that the switching power supply transmits more energy.

In the case that the output voltage of the switching power supply indicates a small load, the switching power supply needs to transmit less energy. In this case, the frequency of the control signal is lower, and the pulse width of the control signal is smaller. Correspondingly, the frequency of the primary master control power transistor 105 is lower, and the current of the primary master control power transistor 105 is smaller, such that the switching power supply transmits less energy.

In the switching power supply and the control method thereof, upon startup of the switching power supply, the secondary control module sends the first handshake signal via the isolation and communication module to the primary control module, such that the primary control module is instructed, by the first handshake signal, to control the primary master control power transistor to stop the switching operation. Upon elapse of the first duration, in response to the voltage value at the connection point failing to satisfy the predetermined condition within the second duration, the secondary control module determines that the primary master control power transistor stops the switching operation, such that the first handshake between the secondary control module and the primary control module is successfully implemented. The secondary control module sends the second handshake signal via the isolation and communication module to the primary control module, such that the primary control module is instructed, by the second handshake signal, to control the primary master control power transistor to perform the switching operation. In response to the voltage value at the connection point satisfying the predetermined condition within the third duration, the secondary control module determines that the primary master control power transistor performs the switching operation, such that the second handshake between the secondary control module and the primary control module is successfully implemented. In this way, the secondary control module gains control over the primary master control power transistor. Therefore, the secondary control module adjusts the switching state of the primary master control power transistor according to the output voltage of the switching power supply.

In summary, on the premise of not arranging additional elements or devices, the secondary control module and the primary control module implement two handshakes therebetween, such that the secondary control module gains control over the primary master control power transistor from the primary control module. This prevents the primary master control power transistor and the secondary synchronous rectifier transistor from being simultaneously turned on, enables communication between the primary side and the secondary side of the switching power supply having the above described secondary control architecture, and ensures that the switching power supply safely and stably operates.

Based on the description of the above embodiments, the secondary control module 103 may be practiced in a variety of ways.

Hereinafter, in combination with FIG. 3, a specific implementation of the secondary control module 103 is described in detail.

Figure 3:
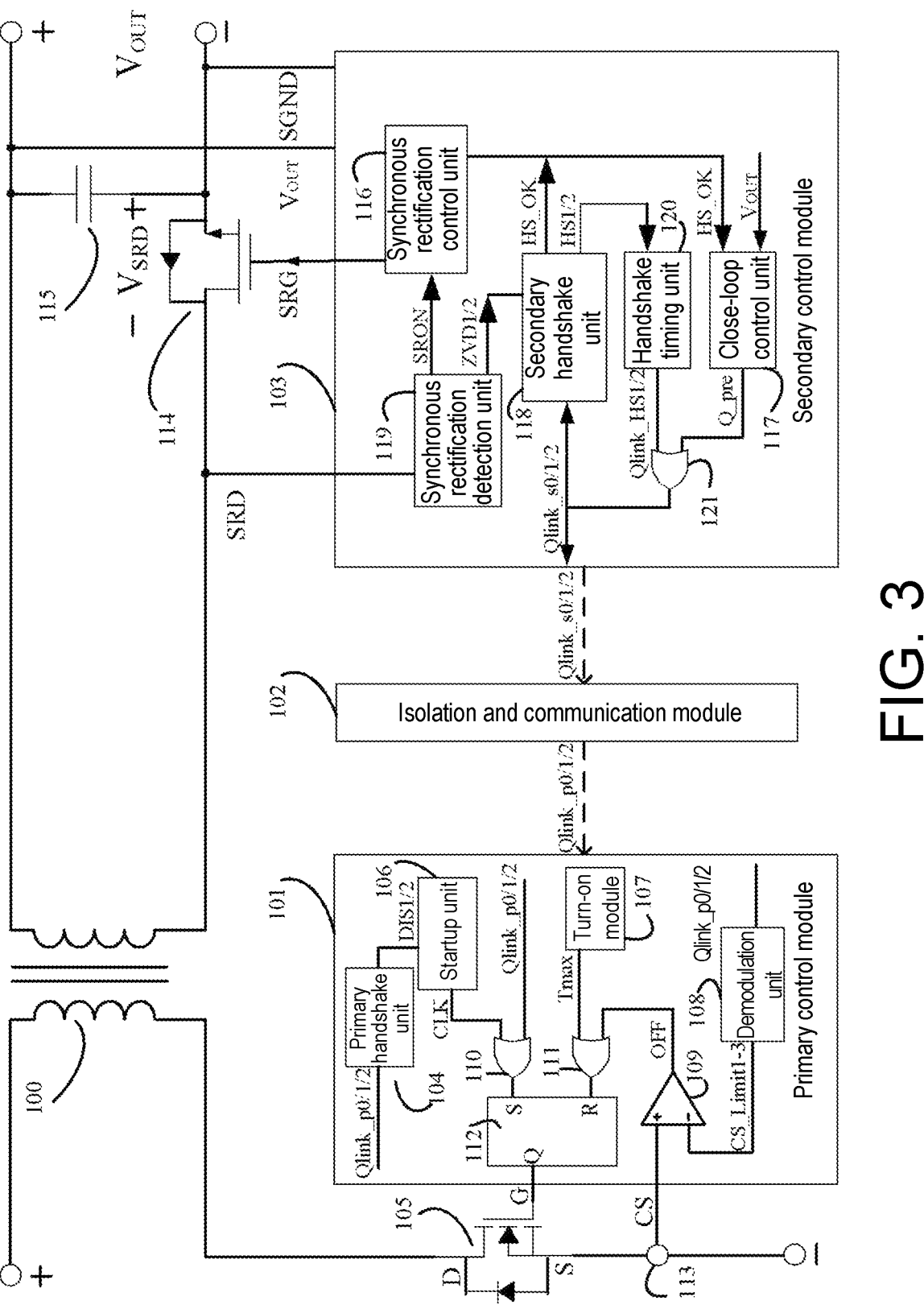
FIG. 3 is a schematic structural diagram of a switching power supply according to an embodiment of the present disclosure.

FIG. 3 is a schematic structural diagram of a switching power supply according to an embodiment of the present disclosure. As illustrated in FIG. 3, in some examples, the secondary control module 103 may include: a synchronous rectification (SR) control unit 116, a close-loop control unit 117, a secondary handshake unit 118, a synchronous rectification detection unit 119, a handshake timing unit 120, and a first logic OR gate 121.

The connection point is located between the secondary side of the transformer 100 and a first terminal of the secondary synchronous rectifier transistor 114, a first terminal of the synchronous rectification detection unit 119 is electrically connected to the connection point, a second terminal of the synchronous rectification detection unit 119 is electrically connected to a first terminal of the synchronous rectification control unit 116, a third terminal of the synchronous rectification detection unit 119 is electrically connected to a first terminal of the secondary handshake unit 118, a second terminal of the secondary handshake unit 118 is electrically connected to both a second terminal of the synchronous rectification control unit 116 and a first terminal of the close-loop control unit 117, a third terminal (SRG) of the synchronous rectification control unit 116 is electrically connected to a second terminal of the secondary synchronous rectifier transistor 114, a third terminal of the secondary synchronous rectifier transistor 114 and the secondary control module 103 are both electrically connected to a secondary signal ground of the transformer 100, a third terminal of the secondary handshake unit 118 is electrically connected to a first terminal of the handshake timing unit 120, a second terminal of the handshake timing unit 120 is electrically connected to a first terminal of the first logic OR gate 121, a second terminal of the close-loop control unit 117 is connected to the output voltage of the switching power supply, a third terminal of the close-loop control unit 117 is electrically connected to a second terminal of the first logic OR gate 121, a fourth terminal of the secondary handshake unit 118 is electrically connected to the isolation and communication module 102, and a third terminal of the first logic OR gate 121 is electrically connected between the fourth terminal of the secondary handshake unit 118 and the isolation and communication module 102.

The synchronous rectification control unit 116 is configured to control turn-on and turn-off of the secondary synchronous rectifier transistor 114.

The close-loop control unit 117 is a main control unit of the secondary control module 103. The close-loop control unit 117 is configured to adjust the switching state of the primary master control power transistor 105 according to the output voltage of the switching power supply.

The secondary handshake unit 118 is configured to notify the synchronous rectification control unit 116 and the close-loop control unit 117 that two handshakes between the primary control module 101 and the secondary control module 103 are successful. The secondary handshake unit 118 is further configured to notify the handshake timing unit 120 of which handshake stage the control modules are involved currently.

The synchronous rectification detection unit 119 is configured to detect the voltage value at the connection point, determine, according to the voltage value at the connection point and different current thresholds, which current threshold the current value of the secondary synchronous rectifier transistor 114 satisfies, send a signal related to a corresponding current threshold to the synchronous rectification control unit 116, to control turn-on and turn-off of the secondary synchronous rectifier transistor 114, determine the voltage value at the connection point satisfies the predetermined condition, and send a signal corresponding to a result of the determination to the secondary handshake unit 118 to indicate whether the handshake is successful.

The handshake timing unit 120 is configured to send a signal to the first logic OR gate 121, and the signal is used to control a frequency and pulse width of the first handshake signal or the second handshake signal.

Figure 4:
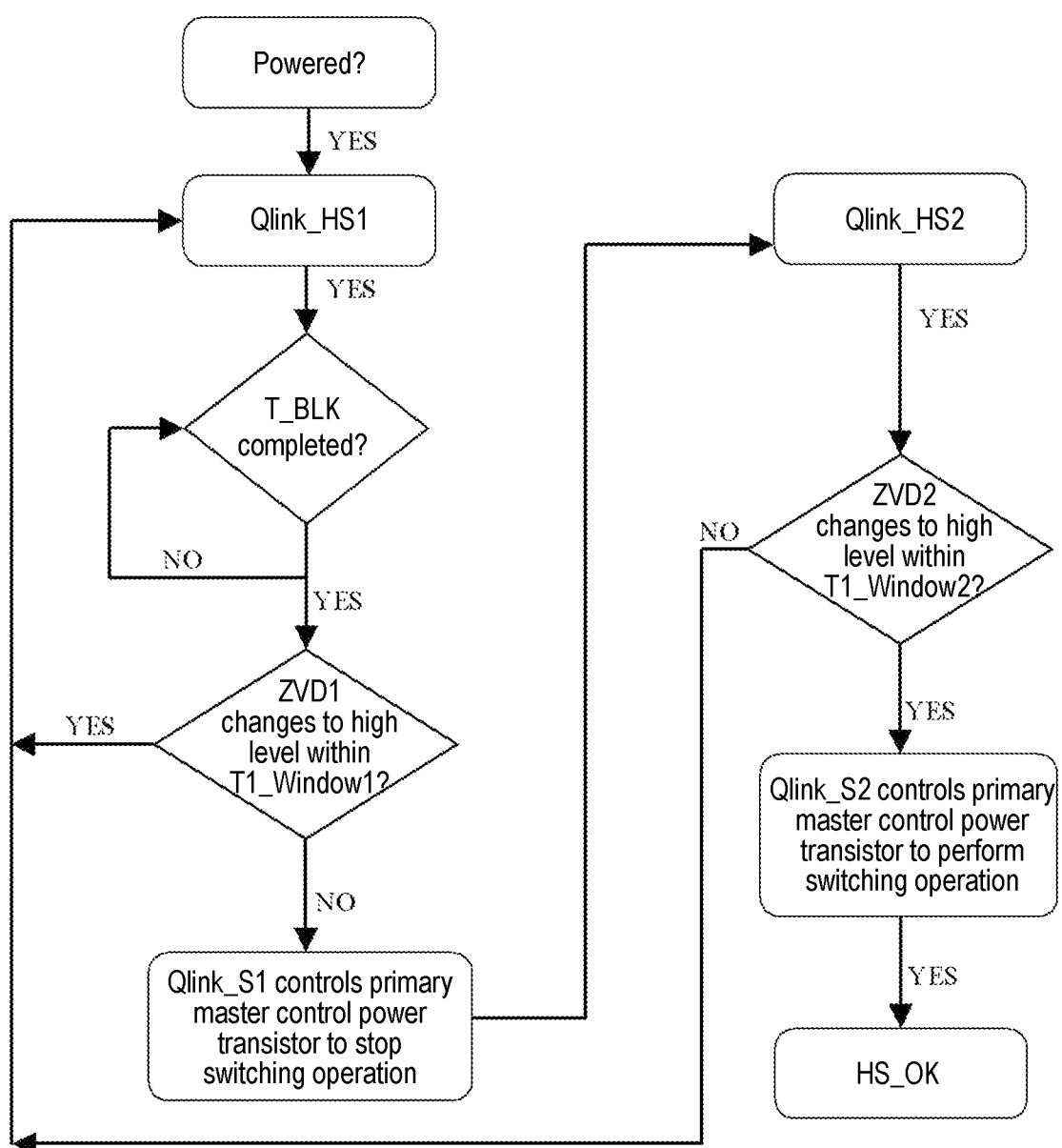
FIG. 4 is a flow timing diagram of a control method according to an embodiment of the present disclosure.

Based on the above description, using a startup stage, a first handshake stage, and a second handshake stage as examples, in combination with FIG. 4, a specific control process of various components of the secondary control module 103 is described.

FIG. 4 is a schematic timing flowchart of a control method according to an embodiment of the present disclosure.

1. Startup Stage

Upon startup of the switching power supply, the secondary control module 103 is powered.

2. First Handshake Stage

When the secondary control module 103 is powered, the close-loop control unit 117 does not operate, that is, the close-loop control unit 117 does not send any signal to the first logic OR gate 121. In this case, the secondary handshake unit 118 may send a first signal (HS1) to the handshake timing unit 120, and the first signal is used to indicate that the primary control module 101 and the secondary control module 103 are involved in the first handshake state currently. The handshake timing unit 120 may send a second signal (Qlink_HS1) to the first logic OR gate 121 according to the first signal, and the second signal is used to control a frequency and pulse width of the first handshake signal. As such, the second signal may be converted to the first handshake signal by logic operation by the first logic OR gate 121, and the first handshake signal is transmittable to the isolation and communication module 102. Apparently, the first handshake signal is controlled by the handshake timing unit 120, and the second signal implements a secure and reliable handshake process.

Counting of the first duration may start from the time the handshake timing unit 120 sends the second signal, that is, an initial time of the first duration is a transmission time of the second signal. Within the first duration, the synchronous rectification detection unit 119 does not operate. Upon elapse of the first duration (T_BLK), the synchronous rectification detection unit 119 detects whether the voltage value at the connection point does not satisfy the predetermined condition within the second duration (T1_Window1) and acquires a first result. The first result is used to determine whether the primary master control power transistor 105 stops the switching operation.

The synchronous rectification detection unit 119 may send a third signal (ZVD1) to the secondary handshake unit 118 according to the first result.

Hereinafter, using a scenario where the secondary synchronous rectifier transistor 114 is an NMOS transistor, and the synchronous rectification detection unit 119 is electrically connected to a drain of the secondary synchronous rectifier transistor 114 as an example, in combination with FIG. 5, a detection process of the third signal is described in detail.

Figure 5:
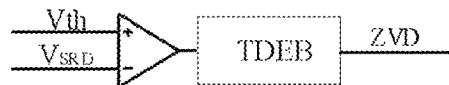
FIG. 5 is a schematic diagram of detecting signals by a secondary handshake unit of a switching power supply according to an embodiment of the present disclosure.

FIG. 5 is a schematic diagram of detecting signals by the secondary handshake unit 118 of a switching power supply according to an embodiment of the present disclosure.

As illustrated in FIG. 5, in the case that the voltage value (VSRD) at the connection point is less than the predetermined threshold (Vth), and a duration where the voltage value (VSRD) at the connection point is less than the predetermined threshold (Vth) is greater than a blanking time (TDEB), a level of the third signal changes to high, which indicates that a voltage at the drain of the primary master control power transistor 105 is higher. The blanking time is the predetermined duration as mentioned above.

Based on the above description, the secondary handshake unit 118 may determine whether the level of the third signal is not raised within the second duration (T1_Window1) to determine whether the primary master control power transistor 105 stops the switching operation.

21. Failure of First Handshake

In the case that the level of the third signal is raised, the first result indicates that the voltage value at the connection point is less than the predetermined threshold, that is, the voltage value at the connection point satisfies the predetermined condition within the second duration. That is, upon receiving the first handshake signal, the primary control module 101 still controls the primary master control power transistor 105 to be turned on again, that is, the primary master control power transistor 105 still performs the switching operation. In this case, the handshake between the secondary control module 103 and the primary control module 101 fails, and the primary master control power transistor 105 is not controlled by the secondary control module 103.

As such, the secondary handshake unit 118 may send the first signal to the handshake timing unit 120 to continue the first handshake stage. In this way, it is ensured that the switching power supply operates reliably.

22. Success of First Handshake

In the case that the level of the third signal is not raised, the first result indicates that the voltage value at the connection point is not less than the predetermined threshold, that is, the voltage value at the connection point does not satisfy the predetermined condition within the second duration. That is, upon receiving the first handshake signal (Qlink_s1), the primary control module 101 does not control the primary master control power transistor 105 to be turned on again, that is, the primary master control power transistor 105 stops the switching operation. In this case, the handshake between the secondary control module 103 and the primary control module 101 is successful, and the primary master control power transistor 105 is controlled by the secondary control module 103.

In this way, the switching power supply may enter the second handshake stage.

3. Second Handshake Stage

In the second handshake stage, the close-loop control unit 117 still does not operate, that is, the close-loop control unit 117 does not send any signal to the first logic OR gate 121. In this case, the secondary handshake unit 118 may send a fourth signal (HS2) to the handshake timing unit 120, and the fourth signal is used to indicate that the primary control module 101 and the secondary control module 103 are involved in the second handshake state currently. The handshake timing unit 120 is configured to send a fifth signal (Qlink_HS2) to the first logic OR gate 121 according to the fourth signal, and the fifth signal is used to control a frequency and pulse width of the second handshake signal. As such, the fifth signal may be converted to the second handshake signal by logic operation by the first logic OR gate 121, and the second handshake signal is transmittable to the isolation and communication module 102. Apparently, the second handshake signal is controlled by the handshake timing unit 120, and the fifth signal implements a secure and reliable handshake process.

In the case that the handshake timing unit 120 sends the fifth signal, the synchronous rectification detection unit 119 detects whether the voltage value at the connection point satisfies the predetermined condition within the third duration (T1_Window2) and acquires a second result. The second result is used to indicate whether the voltage value at the connection point satisfies the predetermined condition within the third duration.

The synchronous rectification detection unit 119 may send a sixth signal (ZVD2) to the secondary handshake unit 118 according to the second result. In addition, the synchronous rectification detection unit 119 may determine, according to the voltage value at the connection point, which current threshold the current value of the secondary synchronous rectifier transistor 114 satisfies. As such, the synchronous rectification detection unit 119 may send a drive signal (SRON) related to a corresponding current threshold to the synchronous rectification control unit 116.

In this way, the secondary handshake unit 118 may determine whether the level of the sixth signal is raised within the third duration (T1_Window2) to determine whether the primary master control power transistor 105 performs the switching operation.

31. Failure of Second Handshake

In the case that the level of the sixth signal is not raised, the second result indicates that the voltage value at the connection point is not less than the predetermined threshold, that is, the voltage value at the connection point does not satisfy the predetermined condition within the third duration. That is, upon receiving the second handshake signal, the primary control module 101 does not control the primary master control power transistor 105 to be turned on again, that is, the primary master control power transistor 105 still stops the switching operation. In this case, the handshake between the secondary control module 103 and the primary control module 101 fails, and the primary master control power transistor 105 is not controlled by the secondary control module 103.

As such, the secondary handshake unit 118 may send the first signal to the handshake timing unit 120 to continue the first handshake stage. In this way, it is ensured that the switching power supply operates reliably.

32. Success of Second Handshake

In the case that the level of the sixth signal is raised, the second result indicates that the voltage value at the connection point is less than the predetermined threshold, that is, the voltage value at the connection point satisfies the predetermined condition within the third duration. That is, upon receiving the second handshake signal (Qlink_s2), the primary control module 101 controls the primary master control power transistor 105 to be turned on again, that is, the primary master control power transistor 105 performs the switching operation. In this case, the handshake between the secondary control module 103 and the primary control module 101 is successful, and the primary master control power transistor 105 is controlled by the secondary control module 103.

Accordingly, the secondary handshake unit 118 may send an indication signal (HS_OK) to the close-loop control unit 117 and the synchronous rectification control unit 116. The indication signal is used to indicate that the secondary control module 103 has gained control over the primary master control power transistor 105 from the primary control module 101, and the secondary control module 103 is capable of normally operating.

In this way, the close-loop control unit 117 determines, according to whether a level of the indication signal changes, whether the close-loop control unit 117 starts operating. In some examples, in the case that the close-loop control unit 117 is not operating, the indication signal is at a low level. In some examples, in the case that the close-loop control unit 117 is operating, the indication signal is at a high level. As such, in the case that it is detected that the indication signal is at a high level, the level of the indication signal changes. Therefore, the close-loop control unit 117 starts operating, and the handshake timing unit 120 stops sending signals to the first logic OR gate 121.

In response to a change of the level of the indication signal, the close-loop control unit 117 may send a seventh signal (Q_pre) to the first logic OR gate 121 according to the output voltage of the switching power supply, and the seventh signal is used to control a frequency and pulse width of the control signal, and the frequency and pulse width of the control signal are used to adjust the switching state of the primary master control power transistor 105. As such, the seventh signal may be converted to the control signal by logic operation by the first logic OR gate 121, and the control signal is transmittable to the isolation and communication module 102 to adjust the switching state of the primary master control power transistor 105. In this way, stable output of the switching power supply is ensured.

In the meantime, upon receiving the drive signal and the indication signal, the synchronous rectification control unit 116 may output an eighth signal to the secondary synchronous rectifier transistor 114 according to the drive signal and the indication signal, and the eighth signal is used to control turn-on and turn-off of the secondary synchronous rectifier transistor 114. Hence, by controlling turn-on and turn-off of the secondary synchronous rectifier transistor 114 by the eighth signal, the primary master control power transistor 105 and the secondary synchronous rectifier transistor 114 are prevented from being simultaneously turned on.

In summary, the secondary control module 103 may complete the two handshake stages with the primary control module 101, and gain control over the primary master control power transistor 105 from the primary control module 101.

Based on the description of the above embodiments, the primary control module 101 may be practiced in a variety of ways.

Hereinafter, in combination with FIG. 3, a specific implementation of the primary control module 101 is described in detail.

As illustrated in FIG. 3, in some examples, the primary control module 101 may include: a primary handshake unit 104, a startup unit 106, a demodulation unit 108, a comparator 109, a second logic OR gate 110, a third logic OR gate 111, a turn-on module 107, and an RS flip-flop 112.

A first terminal of the primary handshake unit 104, a first terminal of the demodulation unit 108, and a second input terminal of the second logic OR gate 110 are all electrically connected to the isolation and communication module 102, a second terminal of the primary handshake unit 104 is electrically connected to a first terminal of the startup unit 106, a second terminal of the startup unit 106 is electrically connected to a first input terminal of the second logic OR gate 110, an output terminal of the second logic OR gate 110 is electrically connected to an S input terminal of the RS flip-flop 112, a Q output terminal of the RS flip-flop 112 is electrically connected to a first terminal of the primary master control power transistor 105, a second terminal of the primary master control power transistor 105 is electrically connected to the primary side of the transformer 100, a third terminal of the primary master control power transistor 105 is electrically connected to the primary signal ground of the transformer 100, a connection point between the third terminal of the primary master control power transistor 105 and the primary signal ground of the transformer 100 is electrically connected to a first input terminal of the comparator 109, a second input terminal of the comparator 109 is electrically connected to a second terminal of the demodulation unit 108, a first input terminal of the third logic OR gate 111 is electrically connected to the turn-on module 107, the turn-on module 107 is configured to output a maximum turn-on duration (Tmax), an output terminal of the comparator 109 is electrically connected to a second input terminal of the third logic OR gate 111, and an output terminal of the third logic OR gate 111 is electrically connected to an R input terminal of the RS flip-flop 112.

The primary handshake unit 104 is configured to, in response to detecting the signal transmitted from the isolation and communication module 102, send a signal to the startup unit 106. In response to the signal, the startup unit 106 stops operating, such that the primary master control power transistor 105 is controlled by the signal transmitted from the isolation and communication module 102.

The startup unit 106 is configured to control, in response to the primary handshake unit 104 not receiving the signal from the isolation and communication module 102, the primary master control power transistor 105 to be turned on.

The demodulation unit 108 is configured to input a current value to the comparator 109. The current value is configured to control the primary master control power transistor 105 to be turned off or turned on. The current value may be a default value, or may be a current value demodulated from the signal transmitted by the isolation and communication module 102.

The comparator 109 is configured to compare an actual current value of the primary master control power transistor 105 with a comparison threshold. The comparison threshold of the comparator 109 is equal to a current value input by the demodulation unit 108 to the comparator 109. A first input terminal of the comparator 109, that is, the connection point between the third terminal of the primary master control power transistor 105 and the primary signal ground of the transformer 100, is a current sampling point 113 of the primary master control power transistor 105, and the current sampling point 113 is capable of sampling the actual current value of the primary master control power transistor 105.

R represents "reset," and S represents "set." In the case that the S input terminal of the RS flip-flop 112 is at a high level, the Q output terminal of the RS flip-flop 112 is set to a high level. In the case that an R input terminal of the RS flip-flop 112 is at a high level, the Q output terminal of the RS flip-flop 112 set to a low level.

Based on the above description, using a startup stage, a first handshake stage, and a second handshake stage as examples, a specific control process of various components of the primary control module 101 is described.

1. Startup Stage

Considering that the switching power supply is in a crash state, the startup unit 106 may control, according to the clock signal (CLK), the primary master control power transistor 105 to be turned on. The demodulation unit 108 may control, according to a first current value (CS_limit1) and an actual current value (CS) of the primary master control power transistor 105, the primary master control power transistor 105 to be turned off. In addition, the primary handshake unit 104 is in the handshake wait state.

The startup unit 106 sends a clock signal to the first input terminal of the second logic OR gate 110, and the second input terminal of the second logic OR gate 110 does not receive the signal transmitted from the isolation and communication module 102. The clock signal is still a clock signal even upon logic operation by the second logic OR gate 110, and the clock signal is transmitted to the S input terminal of the RS flip-flop 112. As such, in response to detecting an incoming rising edge of the clock signal, the RS flip-flop 112 may control the primary master control power transistor 105 to be turned on.

The demodulation unit 108 inputs the first current value to the comparator 109. The first current value may be set to a default value. The first current value is used to implement alternate switching between turn-on and turn-off of the primary master control power transistor 105. The comparator 109 may compare a detected actual current value of the primary master control power transistor 105 with the first current value. In the case that the actual current value of the primary master control power transistor 105 is greater than the first current value, the comparator 109 may control, via the RS flip-flop 112, the primary master control power transistor 105 to be turned off.

2. First Handshake Stage

When the secondary control module 103 is powered, the primary handshake unit 104, the demodulation unit 108, and the second logic OR gate 110 may respectively receive the processed first handshake signal from the isolation and communication module 102.

Upon receiving the processed first handshake signal, the primary handshake unit 104 may send a first stop signal (DIS1) to the startup unit 106. The startup unit 106 may detect whether a level of the first stop signal changes. The first stop signal may change from a low level to a high level, or from a high level to a low level.

In response to a change of the level of the first stop signal, the startup unit 106 may stop controlling, according to the clock signal, the primary master control power transistor 105 to be turned on. In some examples, in response to the first stop signal changing from the low level to the high level, the startup unit 106 may stop transmitting the clock signal to the second logic OR gate 110, such that the primary master control power transistor 105 is controlled by the processed first handshake signal.

Upon receiving the processed first handshake signal, the demodulation unit 108 may demodulate a second current value (CS_limit2) modulated in the first handshake signal. The demodulation unit 108 may control, according to the second current value and an actual current value of the primary master control power transistor 105, the primary master control power transistor 105 to be turned off.

The demodulation unit 108 inputs the second current value to the comparator 109. The second current value is used to control the primary master control power transistor 105 to stop alternate switching between turn-on and turn-off. The secondary control module 103 may modulate the second current value having the above-mentioned control function to the first handshake signal, and modulate the actual current value of the primary master control power transistor 105 to a high-level pulse width of the first handshake signal. The comparator 109 may compare an actual current value of the primary master control power transistor 105 with the second current value. In the case that the actual current value of the primary master control power transistor 105 is greater than the second current value, the comparator 109 may control, via the RS flip-flop 112, the primary master control power transistor 105 to be turned off.

In this way, under control of the first handshake signal, the primary master control power transistor 105 stops the switching operation. Upon elapse of the first duration, in response to the voltage value at the connection point failing to satisfy the predetermined condition within the second duration, the secondary control module 103 may determine that the primary master control power transistor 105 stops the switching operation. As such, the secondary control module 103 may send the second handshake signal to the primary control module 101 via the isolation and communication module 102.

3. Second Handshake Stage

In the second handshake stage, the primary handshake unit 104, the demodulation unit 108, and the second logic OR gate 110 may respectively receive the processed second handshake signal from the isolation and communication module 102.

Upon receiving the processed second handshake signal, the primary handshake unit 104 sends a second stop signal whose level has changed to the startup unit 106. The startup unit 106 may continuously stop controlling, according to the clock signal, the primary master control power transistor 105 to be turned on.

Upon receiving the processed second handshake signal, the primary handshake unit 104 may send a second stop signal (DIS2) to the startup unit 106. The startup unit 106 may detect whether a level of the second stop signal is the same as the changed level of the first stop signal. The second stop signal may be at a low level or a high level.

In the case that the level of the second stop signal is the same as the changed level of the first stop signal, the startup unit 106 may stop controlling, according to the clock signal, the primary master control power transistor 105 to be turned on. In some examples, in response to the first stop signal changing from a low level to a high level and the second stop signal being at a high level, the startup unit 106 may stop transmitting the clock signal to the second logic OR gate 110, such that the primary master control power transistor 105 is controlled by the processed second handshake signal.

Upon receiving the processed second handshake signal, the demodulation unit 108 may demodulate a third current value (CS_limit3) modulated in the second handshake signal. The demodulation unit 108 may control, according to the third current value and an actual current value of the primary master control power transistor 105, the primary master control power transistor 105 to be turned on.

The demodulation unit 108 inputs the third current value to the comparator 109. The third current value is used to implement alternate switching between turn-on and turn-off of the primary master control power transistor 105. The secondary control module 103 may modulate the third current value having the above-mentioned control function into the second handshake signal, and modulate the actual current value of the primary master control power transistor 105 to a high-level pulse width of the second handshake signal. The comparator 109 may compare an actual current value of the primary master control power transistor 105 with the third current value. In the case that the actual current value of the primary master control power transistor 105 is less than the third current value, the comparator 109 may control, via the RS flip-flop 112, the primary master control power transistor 105 to be turned on.

In this way, under control of the second handshake signal, the primary master control power transistor 105 performs the switching operation. In response to the voltage value at the connection point satisfying the predetermined condition within the third duration, the secondary control module 103 determines that the primary master control power transistor 105 performs the switching operation. As such, the secondary control module 103 may send the control signal to the primary control module 101 via the isolation and communication module 102.

Based on the description of the primary control module 101 and the secondary control module 103, hereinafter, in combination with FIG. 6, a timing flowchart of the control method according to the present disclosure is described in detail.

Figure 6:
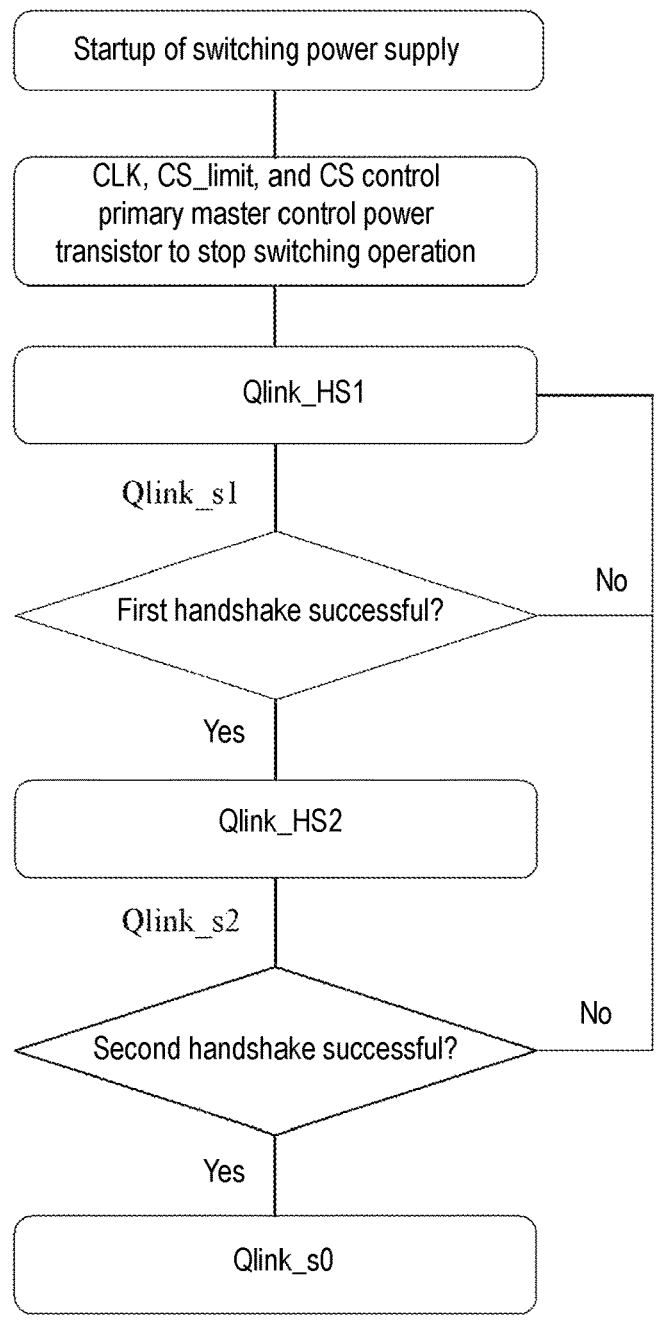
FIG. 6 is a flow timing diagram of a control method according to an embodiment of the present disclosure.

FIG. 6 is a schematic timing flowchart of a control module according to an embodiment of the present disclosure.

As illustrated in FIG. 6, in the startup stage, the primary control module 101 controls, according to the clock signal (CLK), the primary master control power transistor 105 to be turned on, and controls, according to the first current value (CS_limit1) and the actual current value (CS) of the primary master control power transistor 105, the primary master control power transistor 105 to be turned off, such that the primary control module 101 controls the primary master control power transistor 105 to perform the switching operation.

In the first handshake stage, the secondary control module 103 sends the first handshake signal (Qlink_s1) according to the second signal (Qlink_HS1), and determines whether the first handshake between the secondary control module 103 and the primary control module 101 is successful.

In the case that the first handshake fails, the process returns to the startup stage. In the case that the first handshake is successful, the secondary control module 103 enters the second handshake stage.

In the second handshake stage, the secondary control module 103 sends the second handshake signal (Qlink_s2) according to the fifth signal (Qlink_HS2), and determines whether the second handshake between the secondary control module 103 and the primary control module 101 is successful.

In the case that the second handshake fails, the process returns to the first handshake stage. In the case that the second handshake is successful, the secondary control module 103 sends the control signal (Qlink_s0) to adjust the switching state of the primary master control power transistor 105.

It should be finally noted that the above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A switching power supply, comprising: a transformer, a primary control module, a secondary control module, a primary master control power transistor, a secondary synchronous rectifier transistor, and an isolation and communication module; wherein a primary side of the transformer is electrically connected to the primary master control power transistor, the primary master control power transistor is further electrically connected to the primary control module, a secondary side of the transformer is electrically connected to the secondary synchronous rectifier transistor, a connection point between the secondary side of the transformer and the secondary synchronous rectifier transistor is electrically connected to the secondary control module, the primary control module is further electrically connected to the isolation and communication module, and the isolation and communication module is further electrically connected to the secondary control module;

the secondary control module is configured to, upon startup of the switching power supply, send a first handshake signal to the primary control module via the isolation and communication module, wherein the first handshake signal is used to instruct the primary control module to control the primary master control power transistor to stop a switching operation;

the secondary control module is further configured to, upon elapse of a first duration, in response to a voltage value at the connection point failing to satisfy a predetermined condition within a second duration, determine that the primary master control power transistor stops the switching operation, and send a second handshake signal to the primary control module via the isolation and communication module, wherein the second handshake signal is used to instruct the primary control module to control the primary master control power transistor to perform the switching operation; and the secondary control module is further configured to, in response to the voltage value at the connection point satisfying the predetermined condition within a third duration, determine that the primary master control power transistor performs the switching operation, and adjust a switching state of the primary master control power transistor according to an output voltage of the switching power supply;

wherein the predetermined condition comprises: the voltage value at the connection point changing from being greater than a predetermined threshold to being less than the predetermined threshold.

2. The switching power supply according to claim 1, wherein the secondary control module is further configured to send the first handshake signal to the primary control module via the isolation and communication module in response to the voltage value at the connection point satisfying the predetermined condition within the second duration or failing to satisfy the predetermined condition within the third duration.

3. The switching power supply according to claim 1, wherein the secondary control module comprises: a synchronous rectification control unit, a close-loop control unit, a secondary handshake unit, a synchronous rectification detection unit, a handshake timing unit, and a first logic OR gate; wherein the connection point is located between the secondary side of the transformer and a first terminal of the secondary synchronous rectifier transistor, a first terminal of the synchronous rectification detection unit is electrically connected to the connection point, a second terminal of the synchronous rectification detection unit is electrically connected to a first terminal of the synchronous rectification control unit, a third terminal of the synchronous rectification detection unit is electrically connected to a first terminal of the secondary handshake unit, a second terminal of the secondary handshake unit is electrically connected to both a second terminal of the synchronous rectification control unit and a first terminal of the close-loop control unit, a third terminal of the synchronous rectification control unit is electrically connected to a second terminal of the secondary synchronous rectifier transistor, a third terminal of the secondary synchronous rectifier transistor and the secondary control module are both electrically connected to a secondary signal ground of the transformer, a third terminal of the secondary handshake unit is electrically connected to a first terminal of the handshake timing unit, a second terminal of the handshake timing unit is electrically connected to a first terminal of the first logic OR gate, a second terminal of the close-loop control unit is connected to the output voltage of the switching power supply, a third terminal of the close-loop control unit is electrically connected to a second terminal of the first logic OR gate, a fourth terminal of the secondary handshake unit is electrically connected to the isolation and communication module, and a third terminal of the first logic OR gate is electrically connected between the fourth terminal of the secondary handshake unit and the isolation and communication module;

the secondary handshake unit is configured to, upon startup of the switching power supply, send a first signal to the handshake timing unit;

the handshake timing unit is configured to send a second signal to the first logic OR gate according to the first signal, wherein the second signal is used to control a frequency and pulse width of the first handshake signal;

the first logic OR gate is configured to send the first handshake signal to the primary control module via the isolation and communication module according to the second signal;

the synchronous rectification detection unit is configured to, upon elapse of the first duration, in response to the voltage value at the connection point failing to satisfy the predetermined condition within the second duration, determine that the primary master control power transistor stops the switching operation, and send a third signal to the secondary handshake unit;

the secondary handshake unit is further configured to, in response to a level of the third signal failing to be raised, determine that a first handshake between the primary control module and the secondary control module is successful, and send a fourth signal to the handshake timing unit;

the handshake timing unit is further configured to send a fifth signal to the first logic OR gate based on the fourth signal, wherein the fifth signal is used to control a frequency and pulse width of the second handshake signal;

the first logic OR gate is further configured to send the second handshake signal to the primary control module via the isolation and communication module according to the fifth signal;

the synchronous rectification detection unit is further configured to, in response to the voltage value at the connection point satisfying the predetermined condition within the third duration, determine that the primary master control power transistor performs the switching operation, and send a sixth signal to the secondary handshake unit and send a drive signal to the synchronous rectification control unit;

the secondary handshake unit is further configured to, in response to a level of the sixth signal being raised, determine that a second handshake between the primary control module and the secondary control module is successful, and send an indication signal with a predetermined level to the close-loop control unit and the synchronous rectification control unit;

the close-loop control unit is configured to, in response to a change of the level of the indication signal, send a seventh signal to the first logic OR gate according to the output voltage of the switching power supply, wherein the seventh signal is used to control a frequency and pulse width of a control signal, and the frequency and pulse width of the control signal are used to adjust a switching state of the primary master control power transistor;

the first logic OR gate is further configured to send the control signal to the primary control module via the isolation and communication module according to the seventh signal; and the synchronous rectification control unit is configured to output an eighth signal to the secondary synchronous rectifier transistor according to the drive signal and the indication signal, wherein the eighth signal is used to control turn-on and turn-off of the secondary synchronous rectifier transistor.

4. The switching power supply according to claim 1, wherein the primary control module comprises: a primary handshake unit, a startup unit, a demodulation unit, a comparator, a second logic OR gate, a third logic OR gate, a turn-on module, and an RS flip-flop; wherein a first terminal of the primary handshake unit, a first terminal of the demodulation unit, and a second input terminal of the second logic OR gate are all electrically connected to the isolation and communication module, a second terminal of the primary handshake unit is electrically connected to a first terminal of the startup unit, a second terminal of the startup unit is electrically connected to a first input terminal of the second logic OR gate, an output terminal of the second logic OR gate is electrically connected to an S input terminal of the RS flip-flop, a Q output terminal of the RS flip-flop is electrically connected to a first terminal of the primary master control power transistor, a second terminal of the primary master control power transistor is electrically connected to the primary side of the transformer, a third terminal of the primary master control power transistor is electrically connected to the primary signal ground of the transformer, a connection point between the third terminal of the primary master control power transistor and the primary signal ground of the transformer is electrically connected to a first input terminal of the comparator, a second input terminal of the comparator is electrically connected to a second terminal of the demodulation unit, a first input terminal of the third logic OR gate is electrically connected to the turn-on module, an output terminal of the comparator is electrically connected to a second input terminal of the third logic OR gate, and an output terminal of the third logic OR gate is electrically connected to an R input terminal of the RS flip-flop;

the turn-on module is configured to output a maximum turn-on duration;

the startup unit is configured to, upon startup of the switching power supply, control the primary master control power transistor to be turned on according to a clock signal;

the demodulation unit is configured to control, according to a first current value and an actual current value of the primary master control power transistor, the primary master control power transistor to be turned off;

the primary handshake unit is configured to send a first stop signal to the startup unit in response to receiving the first handshake signal via the isolation and communication module;

the startup unit is further configured to, in response to the first stop signal, stop controlling, according to the clock signal, the primary master control power transistor to be turned on;

the demodulation unit is further configured to, in response to receiving the first handshake signal via the isolation and communication module, demodulate a second current value modulated in the first handshake signal, and control the primary master control power transistor to be turned off according to the second current value and the actual current value of the primary master control power transistor;

the primary handshake unit is further configured to send a second stop signal to the startup unit in response to receiving the second handshake signal via the isolation and communication module;

the startup unit is further configured to, in response to the second stop signal, stop controlling, according to the clock signal, the primary master control power transistor to be turned on; and the demodulation unit is further configured to, in response to receiving the second handshake signal via the isolation and communication module, demodulate a third current value modulated in the second handshake signal, and control the primary master control power transistor to be turned on according to the third current value and the actual current value of the primary master control power transistor.

5. The switching power supply according to claim 1, wherein the switching power supply is a charger.

6. The switching power supply according to claim 1, wherein the predetermined condition further comprises: a duration where the voltage value is less than the predetermined threshold being greater than or equal to a predetermined duration.

7. The switching power supply according to claim 1, wherein a period of the first handshake signal is greater than or equal to a sum of the first duration and the second duration.

8. The switching power supply according to claim 1, wherein a period of the second handshake signal is greater than or equal to the third duration.

9. A method for controlling a switching power supply, wherein the switching power supply comprises: a transformer, a primary control module, a secondary control module, a primary master control power transistor, a secondary synchronous rectifier transistor, and an isolation and communication module; wherein a primary side of the transformer is electrically connected to the primary master control power transistor, the primary master control power transistor is further electrically connected to the primary control module, a secondary side of the transformer is electrically connected to the secondary synchronous rectifier transistor, a connection point between the secondary side of the transformer and the secondary synchronous rectifier transistor is electrically connected to the secondary control module, the primary control module is further electrically connected to the isolation and communication module, and the isolation and communication module is further electrically connected to the secondary control module;

wherein the method comprises:

sending, by the secondary control module, upon startup of the switching power supply, a first handshake signal to the primary control module via the isolation and communication module, wherein the first handshake signal is used to instruct the primary control module to control the primary master control power transistor to stop a switching operation;

determining, by the secondary control module, upon elapse of a first duration, in response to a voltage value at the connection point failing to satisfy a predetermined condition within a second duration, that the primary master control power transistor stops the switching operation, and sending a second handshake signal to the primary control module via the isolation and communication module, wherein the second handshake signal is used to instruct the primary control module to control the primary master control power transistor to perform the switching operation; and determining, by the secondary control module, in response to the voltage value at the connection point failing to satisfy the predetermined condition within a third duration, that the primary master control power transistor performs the switching operation, and adjusting a switching state of the primary master control power transistor according to an output voltage of the switching power supply;

wherein the predetermined condition comprises: the voltage value at the connection point changing from being greater than a predetermined threshold to being less than the predetermined threshold.

10. The method according to claim 9, further comprising:

sending, by the secondary control module, the first handshake signal via the isolation and communication module to the primary control module in response to the voltage value at the connection point satisfying the predetermined condition within the second duration or failing to satisfy the predetermined condition within the third duration.

11. The method according to claim 9, wherein the predetermined condition further comprises: a duration where the voltage value is less than the predetermined threshold being greater than or equal to a predetermined duration.

12. The method according to claim 9, wherein a period of the first handshake signal is greater than or equal to a sum of the first duration and the second duration.

13. The method according to claim 9, wherein a period of the second handshake signal is greater than or equal to the third duration.

14. The method according to claim 9, wherein the secondary control module comprises: a synchronous rectification control unit, a close-loop control unit, a secondary handshake unit, a synchronous rectification detection unit, a handshake timing unit, and a first logic OR gate; wherein the connection point is located between the secondary side of the transformer and a first terminal of the secondary synchronous rectifier transistor, a first terminal of the synchronous rectification detection unit is electrically connected to the connection point, a second terminal of the synchronous rectification detection unit is electrically connected to a first terminal of the synchronous rectification control unit, a third terminal of the synchronous rectification detection unit is electrically connected to a first terminal of the secondary handshake unit, a second terminal of the secondary handshake unit is electrically connected to both a second terminal of the synchronous rectification control unit and a first terminal of the close-loop control unit, a third terminal of the synchronous rectification control unit is electrically connected to a second terminal of the secondary synchronous rectifier transistor, a third terminal of the secondary synchronous rectifier transistor and the secondary control module are both electrically connected to a secondary signal ground of the transformer, a third terminal of the secondary handshake unit is electrically connected to a first terminal of the handshake timing unit, a second terminal of the handshake timing unit is electrically connected to a first terminal of the first logic OR gate, a second terminal of the close-loop control unit is connected to the output voltage of the switching power supply, a third terminal of the close-loop control unit is electrically connected to a second terminal of the first logic OR gate, a fourth terminal of the secondary handshake unit is electrically connected to the isolation and communication module, and a third terminal of the first logic OR gate is electrically connected between the fourth terminal of the secondary handshake unit and the isolation and communication module;

wherein the method further comprises:

sending, by the secondary handshake unit, upon startup of the switching power supply, a first signal to the handshake timing unit;

sending, by the handshake timing unit, a second signal to the first logic OR gate according to the first signal, wherein the second signal is used to control a frequency and pulse width of the first handshake signal;

sending, by the first logic OR gate, the first handshake signal to the primary control module via the isolation and communication module according to the second signal;

determining, by the synchronous rectification detection unit, upon elapse of the first duration, in response to the voltage value at the connection point failing to satisfy the predetermined condition within the second duration, that the primary master control power transistor stops the switching operation, and sending a third signal to the secondary handshake unit;

determining, by the secondary handshake unit, in response to a level of the third signal failing to be raised, that a first handshake between the primary control module and the secondary control module is successful, and sending a fourth signal to the handshake timing unit;

sending, by the handshake timing unit, a fifth signal to the first logic OR gate based on the fourth signal, wherein the fifth signal is used to control a frequency and pulse width of the second handshake signal;

sending, by the first logic OR gate, the second handshake signal to the primary control module via the isolation and communication module according to the fifth signal;

determining, by the synchronous rectification detection unit, in response to the voltage value at the connection point satisfying the predetermined condition within the third duration, that the primary master control power transistor performs the switching operation, and sending a sixth signal to the secondary handshake unit and sending a drive signal to the synchronous rectification control unit;

determining, by the secondary handshake unit, in response to a level of the sixth signal being raised, that a second handshake between the primary control module and the secondary control module is successful, and sending an indication signal with a predetermined level to the close-loop control unit and the synchronous rectification control unit;

sending, by the close-loop control unit, in response to a change of the level of the indication signal, a seventh signal to the first logic OR gate according to the output voltage of the switching power supply, wherein the seventh signal is used to control a frequency and pulse width of a control signal, and the frequency and pulse width of the control signal are used to adjust a switching state of the primary master control power transistor;

sending, by the first logic OR gate, the control signal to the primary control module via the isolation and communication module according to the seventh signal; and outputting, by the synchronous rectification control unit, an eighth signal to the secondary synchronous rectifier transistor according to the drive signal and the indication signal, wherein the eighth signal is used to control turn-on and turn-off of the secondary synchronous rectifier transistor.

15. The method according to claim 9, wherein the primary control module comprises: a primary handshake unit, a startup unit, a demodulation unit, a comparator, a second logic OR gate, a third logic OR gate, a turn-on module, and an RS flip-flop; wherein a first terminal of the primary handshake unit, a first terminal of the demodulation unit, and a second input terminal of the second logic OR gate are all electrically connected to the isolation and communication module, a second terminal of the primary handshake unit is electrically connected to a first terminal of the startup unit, a second terminal of the startup unit is electrically connected to a first input terminal of the second logic OR gate, an output terminal of the second logic OR gate is electrically connected to an S input terminal of the RS flip-flop, a Q output terminal of the RS flip-flop is electrically connected to a first terminal of the primary master control power transistor, a second terminal of the primary master control power transistor is electrically connected to the primary side of the transformer, a third terminal of the primary master control power transistor is electrically connected to the primary signal ground of the transformer, a connection point between the third terminal of the primary master control power transistor and the primary signal ground of the transformer is electrically connected to a first input terminal of the comparator, a second input terminal of the comparator is electrically connected to a second terminal of the demodulation unit, a first input terminal of the third logic OR gate is electrically connected to the turn-on module, an output terminal of the comparator is electrically connected to a second input terminal of the third logic OR gate, and an output terminal of the third logic OR gate is electrically connected to an R input terminal of the RS flip-flop;

wherein the method further comprises:

outputting, by the turn-on module, a maximum turn-on duration;

controlling, by the startup unit, upon startup of the switching power supply, the primary master control power transistor to be turned on according to a clock signal;

controlling, by the demodulation unit, according to a first current value and an actual current value of the primary master control power transistor, the primary master control power transistor to be turned off;

sending, by the primary handshake unit, a first stop signal to the startup unit in response to receiving the first handshake signal via the isolation and communication module;

stopping, by the startup unit, in response to the first stop signal, controlling, according to the clock signal, the primary master control power transistor to be turned on;

demodulating, by the demodulation unit, in response to receiving the first handshake signal via the isolation and communication module, a second current value modulated in the first handshake signal, and controlling the primary master control power transistor to be turned off according to the second current value and the actual current value of the primary master control power transistor;

sending, by the primary handshake unit, a second stop signal to the startup unit in response to receiving the second handshake signal via the isolation and communication module;

stopping, by the startup unit, in response to the second stop signal, controlling, according to the clock signal, the primary master control power transistor to be turned on; and demodulating, by the demodulation unit, in response to receiving the second handshake signal via the isolation and communication module, a third current value modulated in the second handshake signal, and controlling the primary master control power transistor to be turned on according to the third current value and the actual current value of the primary master control power transistor.

* * * * *